(12) United States Patent
Zlotnick

(10) Patent No.: US 6,665,839 B1
(45) Date of Patent: Dec. 16, 2003

(54) METHOD, SYSTEM, PROCESSOR AND PROGRAM PRODUCT FOR DISTINGUISHING BETWEEN SIMILAR FORMS

(75) Inventor: Aviad Zlotnick, Mitzpe Notofah (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/340,964

(22) Filed: Jun. 28, 1999

(30) Foreign Application Priority Data

Aug. 31, 1998 (EP) .............................................. 9480060

(51) Int. Cl.[7] ............................................. G06F 17/00
(52) U.S. Cl. ...................... 715/505; 382/181; 382/173; 382/309
(58) Field of Search ......................... 700/223; 707/506, 707/517; 382/213, 181, 309, 173; 715/506, 507

(56) References Cited

U.S. PATENT DOCUMENTS

| | | | |
|---|---|---|---|
| 4,805,224 A | | 2/1989 | Koezuka et al. ............... 382/24 |
| 5,293,429 A | | 3/1994 | Pizano et al. ................... 382/8 |
| 5,642,288 A | | 6/1997 | Leung et al. ........... 364/478.11 |
| 5,717,794 A | * | 2/1998 | Koga et al. .................. 382/309 |
| 5,721,940 A | * | 2/1998 | Luther et al. ............... 707/506 |
| 5,757,958 A | * | 5/1998 | Shimizu et al. ............. 382/181 |
| 5,845,303 A | * | 12/1998 | Templeman ................. 707/517 |
| 5,877,963 A | * | 3/1999 | Leung et al. ............... 700/223 |
| 6,026,187 A | * | 2/2000 | Siegel ......................... 382/213 |

FOREIGN PATENT DOCUMENTS

| | | |
|---|---|---|
| EP | 0 616 296 A3 | 9/1994 |
| JP | 03-087972 | 4/1991 |

OTHER PUBLICATIONS

Matsunaga et al., "A Study of Document Format Identification Based on Table Structure," NTT Data Communications Systems Corporation, Development Headquarters, *IEEE, XP010091560*, 1989.

* cited by examiner

Primary Examiner—Joseph H. Feild
Assistant Examiner—Maikhanh Nguyen
(74) Attorney, Agent, or Firm—Law Office of Charles W. Peterson, Jr.; Louis J. Percello

(57) ABSTRACT

A system for identifying distinguishing features between an input new blank form and another blank form. The system includes a processor and memory capable of identifying a property in the input form which is sufficiently from a corresponding property in the other form. The identified property complies with a criterion that relates to the likelihood that the property is retained substantially invariable under use of the form. The specified property constitutes a verification property. In the case that no property is identified as a verification property, identifying a property in the other form which is sufficiently distinguishable from a corresponding property in the input form. This identified property complies with a criterion that relates to the likelihood that the property is retained invariable under use of the input form. The latter property constitutes a rejection property.

19 Claims, 5 Drawing Sheets

METHOD, SYSTEM, PROCESSOR AND PROGRAM PRODUCT FOR DISTINGUISHING BETWEEN SIMILAR FORMS

FIELD OF THE INVENTION

The present invention is in the general field of automatic processing of forms and relates, more specifically, to distinguishing between similar forms, and classifying an input form as one out of few possible similar forms.

BACKGROUND OF THE INVENTION

With the development of advanced image processing technologies, image processing applications have been introduced including automatic processing of forms. The latter application is useful e.g. for mass processing of application forms in various organizations such as post offices, telephone companies and others. An exemplary form processing application is the IFP system, commercially available from IBM Corp. Automatic form processing of the kind specified carries the obvious advantage that manual processing may be completely or partially eliminated thereby not only expediting the processing rate but also lowering costs by reducing manpower.

In a typical form processing application, it is necessary to store, in advance, templates of similar blank forms (constituting a list of candidate forms). When an already filled-in form is fed to the application for processing, it is necessary to identify the correct candidate blank form in the list and to "subtract" it from the filled form thereby obtaining the filled-in data that are then used for further processing. Ideally, the list of candidate forms has exactly one member in which case the only member obviously corresponds to the input filled-in form. However, in many real life scenarios, the list of candidates may exceed, say 20 members thus hindering the assignment of an input form to the correct candidate.

There is, accordingly, a need in the art for a processing technique, capable of minimizing the list of potential form candidates, preferably to only one. There is a further need in the art for a training technique which automatically identifies the distinctive features of a blank form, vis-a-vis other similar forms and stores them in a database for future form processing purposes.

SUMMARY OF THE INVENTION

According to the invention there is provided a method for identifying at least one distinguishing feature between an input new blank form B and an already stored blank form A, comprising the steps of:

(a) obtaining first and second images that correspond to said form A and form B, respectively;

(b) substantially aligning the first image with respect to the second image or vise versa;

(c) defining boxes in the second image, each box constituting a sub-image in said image that corresponds to an area in the blank form B;

(d) ranking the boxes so as to give rise to respective box rank scores, the ranking criteria used for ranking each box includes a first criterion: the likelihood that the area in the blank form B is a fill-in area;

(e) identifying a box from among the boxes of step (d) such that at least the following conditions are met:

(i) it is sufficiently distinguishable from a corresponding box of said first image;

(ii) it has a good box rank score; said box constituting a verification box;

(f) in the case that no box is identified in said step (e), identifying a box from among the boxes of said first image such that at least the following conditions are met:

(i) it is sufficiently distinguishable from a corresponding box of said second image;

(ii) it has a good box rank score; said box constituting a rejection box.

The invention further provides for a method for identifying at least one distinguishing feature between an input new blank form B and other blank form A, comprising the steps of:

(a) identifying at least one property in the input form which is sufficiently distinguishable from a corresponding property in the other form; said identified property complies at least with a criterion that relates to the likelihood that the property is retained substantially invariable under use of the form; said property constitutes a verification property;

(b) in the case that no property is identified in said step (a), identifying at least one property in the other form which is sufficiently distinguishable from a corresponding property in the input form; said identified property complies at least with a criterion that relates to the likelihood that the property is retained invariable under use of the form; said property constitutes a rejection property.

Still further, the invention provides for a method for classifying an input form as corresponding to a candidate blank form from among a list of candidate blank forms; each one of said candidate forms is associated with at least one verification property or rejection property vis-a-vis respective form in said list; said verification property corresponds to a property in said candidate form that sufficiently distinguishes it vis-a-vis another form in the list; said rejection property corresponds to a property in said another form that sufficiently distinguishes it vis-a-vis said candidate form; the method comprising the steps of:

(a) selecting a candidate form from said list;

for the verification property associated with said candidate form, if any, perform: in the case that the verification property substantially mismatches a corresponding property in the input form, indicating that said candidate form does not correspond to said input form; or, for a rejection property associated with said candidate form, if any perform: in the case that the rejection property substantially matches a corresponding property in the input form, indicating that said candidate form does not correspond to said input form;

(b) in the case that the stipulations of step (a) are not met in respect of a number of said candidate forms indicating that said candidate form is classified as corresponding to said input form.

Yet still further the invention provides a system for identifying at least one distinguishing feature between an input new blank form B and an already stored blank form A, the system includes a processor and associated memory comprising:

(a) a device for obtaining first and second images that correspond to said form A and form B, respectively;

(b) aligning device for substantially aligning the first image with respect to the second image or vise versa;

(c) box processing device for defining boxes in the second image, each box constituting a sub-image in said image that corresponds to an area in the blank form B;

(d) box ranking device for ranking the boxes so as to give rise to respective box rank scores, the ranking criteria used for ranking each box includes a first criterion: the likelihood that the area in the blank form B is a fill-in area;

said system further including a decision unit capable of:

(e) identifying a box from among the boxes of step (d) such that at least the following conditions are met:
   (i) it is sufficiently distinguishable from a corresponding box of said first image;
   (ii) it has a good box rank score; said box constituting a verification box.

(f) in the case that no box is identified in (e), identifying a box from among the boxes of said first image such that at least the following conditions are met:
   (i) it is sufficiently distinguishable from a corresponding box of said second image;
   (ii) it has a good box rank score; said box constituting a rejection box.

The invention further provides a system for identifying at least one distinguishing feature between an input new blank form B and other blank form A, the system comprising a processor and associated memory capable of:

(a) identifying at least one property in the input form which is sufficiently distinguishable from a corresponding property in the other form; said identified property complies at least with a criterion that relates to the likelihood that the property is retained substantially invariable under use of the form; said property constitutes a verification property;

(b) in the case that no property is identified in (a), identifying at least one property in the other form which is sufficiently distinguishable from a corresponding property in the input form; said identified property complies at least with a criterion that to the likelihood that the property is retained invariable under use of the form; said property constitutes a rejection property.

Still further the invention provides a system for classifying an input form as corresponding to a candidate blank form from among a list of candidate blank forms; each one of said candidate forms is associated with at least one verification property or rejection property vis-a-vis respective form in said list; said verification property corresponds to a property in said candidate form that sufficiently distinguishes it vis-a-vis another form in the list; said rejection property corresponds to a property in said another form that sufficiently distinguishes it vis-a-vis said candidate form;

the system comprising a processor and associated memory capable of:

(a) selecting a candidate form from said list;
   for the verification property associated with said candidate form, if any, perform: in the case that the verification property substantially mismatches a corresponding property in the input form, indicating that said candidate form does not correspond to said input form; or, for a rejection property associated with said candidate form, if any perform: in the case that the rejection property substantially matches a corresponding property in the input form, indicating that said candidate form does not correspond to said input form;

(b) in the case that the stipulations of step (a) are not met in respect of a number of said candidate forms indicating that said candidate form is classified as corresponding to said input form.

Still further the invention provides a processor having associated memory that includes data usable by an application selected from a group that includes form training and form classification applications; the data includes data being representative of:

a plurality of a similar forms, each form is associated with:
   at least one verification property which is sufficiently distinguishable vis-a-vis the property of another form; said property complies at least with a criterion that relates to the likelihood that the property is retained substantially invariable under use of the form;
   at least one rejection property of said another form which is sufficiently distinguishable vis-a-vis the property of said form; said property complies at least with a criterion that relates to the likelihood that the property is retained substantially invariable under use of the form.

BRIEF DESCRIPTION OF THE DRAWINGS

For a better understanding, the invention will now be described, by way of example only, with reference to the accompanying drawings, in which:

FIGS. 5A–B are two similar forms that serve for exemplifying the training and classification processes as depicted in FIGS. 2 and 4, respectively.

DESCRIPTION OF SPECIFIC EMBODIMENTS

Figure 1:
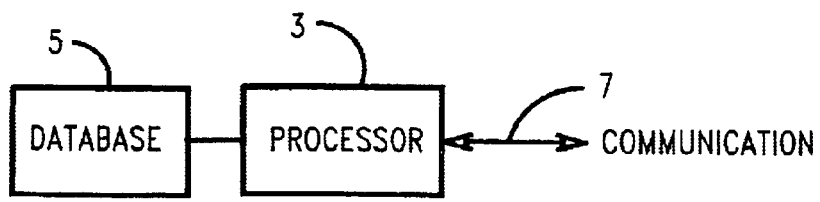
FIG. 1 is a generalized schematic illustration of a system of the invention.

Attention is first directed to FIG. 1 showing a generalized schematic illustration of a system of the invention. As shown, system (1) includes a computer (3) being, e.g. a conventional P.C. or any other known per se computing device associated with a database (5). As will be explained in greater detail below, the database holds information that pertains to candidate blank forms including, but not limited to, so called verification boxes and rejection boxes. The database structure as well as the link to computer (3) are all known per se (and are, of course, not bound to the schematic illustration of FIG. 1) and therefore will not be further expounded upon herein.

The input blank form that has to be classified to preferably one candidate form from among those stored in database (5) is fed in a known per se manner to input (7) and undergoes processing in computer (3) in a manner described below.

The system and method of the invention operates basically in two possible modes of operation: a training mode or a form classification mode of operation.

Figure 3:
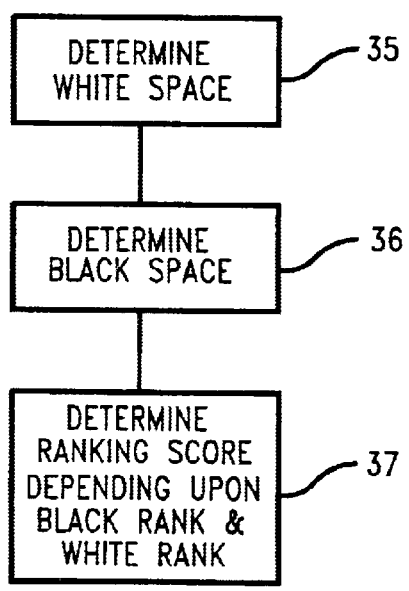
FIG. 3 is a generalized flow chart of a box ranking procedure that forms part of the training process of FIG. 2, according to one embodiment of the invention.
Figure 2:
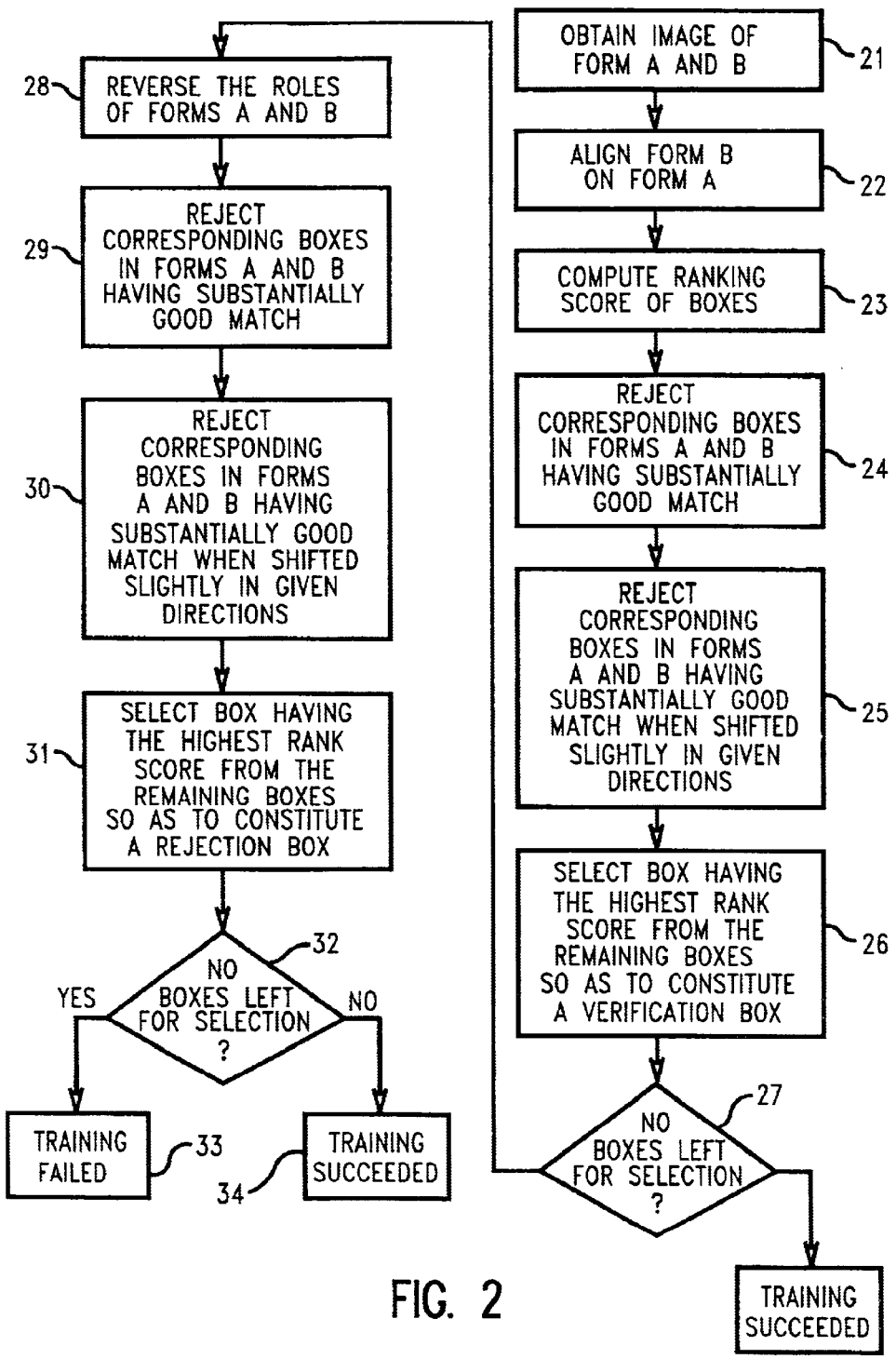
FIG. 2 is a generalized flow chart of a training process, according to one embodiment of the invention.
Figure 5A:
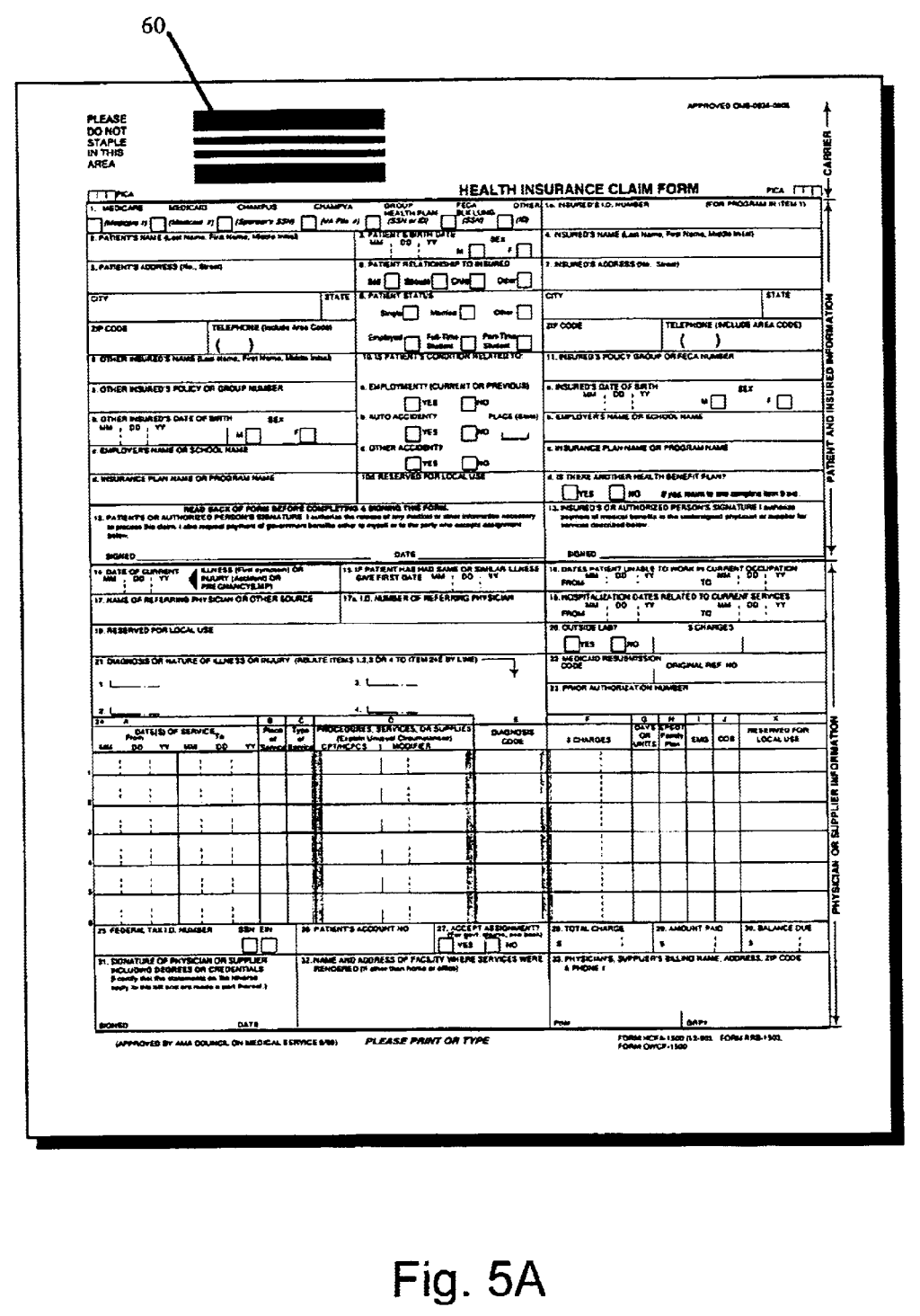
Figure 5B:
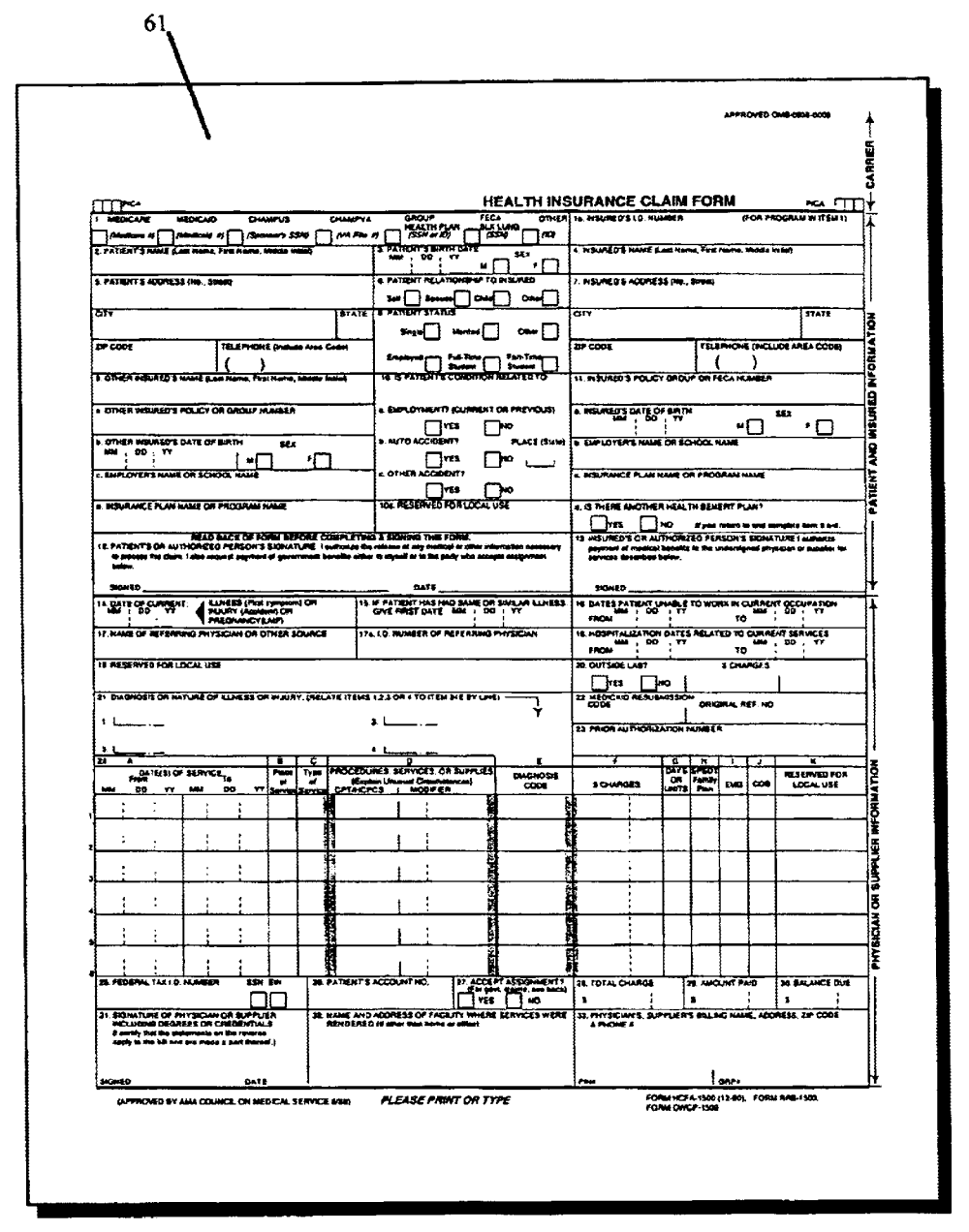

Turning at first to the training process, attention is directed to FIGS. 2, 3 and to the specific examples of FIGS. 5A and 5B. Thus, in a typical course of the training process, it is required to identify at least one distinguishing feature between a new blank form B (see e.g. the form of FIG. 5B) and an already stored blank form A (see e.g. the form of FIG. 5A) whose particulars are already stored in database (5).

As a first stage, the digital image of the specified forms are obtained (21 in FIG. 2). The digital image of form A is extracted from the database whereas that of form B is obtained by utilizing e.g. a known per se scanning device. The invention is, of course, not bound by the explicit representation of the images as shown in FIGS. 5A and 5B and any other known per se representation which facilitates processing is applicable.

Having obtained the images, a known per se registering step is performed for substantially aligning the image of form B to form A or vice versa (22), utilizing to this end known per se techniques, e.g. (U.K. Patent No.9-92-036).

Before turning to the next step (box defining and ranking) it should be noted that the ranking the distinguishing property(ies) of the forms (by this particular example the property being a box that corresponds to an area in the form) is done in order to grade the likelihood that the property will remain invariable during the use of the form. By this particular example the property is to examine the likelihood that the area under question is a fill-in area (i.e. it will be changed in use due to the fact that the applicant or the receiving authority will fill it with data). Obviously, if the area is a fill-in area there is no point in using it as a distinguishing feature. By this example the likelihood that the area under question is a fill-in area is determined by calculating the white space in the box, and more specifically the number of consecutive white line in the box. Thus, large number of white lines indicates a high likelihood that the area under consideration is a fill-in area (which, as explained above is problematic for use as a distinguishing feature between forms) and a large number of black lines indicates that the area may be sensitive to scan contrast. The latter phenomenon may result in an image that does not match the corresponding area in the form from which the image originated.

Turning now to the next step, boxes in the forms B (and A) are defined and ranked (23). The boxes are of a given shape say a square or rectangular. Those versed in the art will readily appreciate that the boxes may be of other geometrical shapes. By the specific example of FIG. 5B, ½" and ¼" square boxes are utilized. In other words, at first, a larger box is utilized and in the case that the training fails (as will be explained in greater detail below), another training strategy is utilized, e.g. by using a ¼" square boxes.

Naturally, the boxes associated with the forms A and B are of comparable shape.

By this particular embodiment the images of the forms are each partitioned into non-overlapping boxes but this is, of course, not obligatory.

The ranking step may be realized in numerous manners and one possible variant is illustrated in FIG. 3. As a first step, the white space in the box to be ranked is calculated (35). One possible heuristic function for determining the white space is to count consecutive white rows in the box where a line is considered only if there is a white space for at least ⅓ of the box width, or the total length of white spaces in the row is more than ⅔ of the box width.

Having determined the white space, the black space in the box is calculated (36), and the heuristic exemplary function that is used counts the number of consecutive black lines, where each line is considered if the total of black pixels is more than ⅔ of the row width.

By this particular embodiment the rank of the box is determined (37) according to the results of steps (35) and (36) such that the maximum from among the number of consecutive white lines and the number of consecutive black lines constitutes the ranking score of the box.

Obviously, the larger the calculated maximum the higher the score of the box, i.e. it constitutes a "bad box" for the purpose of serving as a distinguishing feature between forms. Conversely, boxes having low score are "good boxes" with the lowest score signifying (according to one embodiment) the "best box". Preferably, boxes having an unacceptable high ranking are rejected. It should be noted that the term "high" in connection with ranking score is indicative of a "bad score" and does not necessarily reflect a nominal high score. Thus, by way of example by another embodiment a nominal low rank may be construed as high rank in the sense that it signifies a "bad box".

Reverting now to FIG. 2, after having computed the rank score of the specified box, there commences a box matching procedure (24) utilizing known per se box matching techniques. In the specified box matching procedure, a box in the input form is compared to a corresponding box in an already stored form and in the case that are insufficiently distinguished from each other (e.g. if the respective boxes correspond to identical areas in the two forms), this box of the input form is rejected since it cannot serve as a distinguishing feature between the two forms.

By this particular embodiment and as shown in step (25), all the remaining boxes that are insufficiently distinguishable from each other when slightly shifted in given directions (i.e. one or more direction) are also rejected. In other words, neighboring boxes (slightly shifted with respect to the box) are also compared to their corresponding boxes in the other form. The neighboring boxes may or may not partially overlap said box.

The criterion for what constitutes "sufficiently (or insufficiently) distinguishable" is determined depending upon the particular application.

From among the remaining boxes, the box having, preferably, the best rank score is selected (26), the latter box constitutes a verification box.

Turning now to the examples of FIGS. 5A and 5B, they show two very similar versions of a health insurance claim form, which, as shown, differ ONLY in the top left area of the form (areas (60) and (61), respectively). The rest of the form is completely identical in the two versions.

Thus, following steps (21) to (23), when applying step (24) all the boxes (being by this particular embodiment ½" by ½" or ¼" by ¼" square boxes) in the same location in forms A and B are, as expected, not sufficiently distinguishable and therefore rejected in step (24). The only boxes that are sufficiently distinguishable reside in the area (61). These boxes are, however, rejected due to a very high ranking score thereof as they have large white space (in fact the whole area is white) which signifies that there is a high likelihood that area (61) is a fill-in area.

The net effect is that all the boxes of form B (in FIG. 5B) are rejected due to a high match characteristic or large white space. Consequently, none of the boxes corresponding to form B are identified in step (26) as a verification box. This result complies with the underlying concept of the invention.

For a better understanding of the foregoing, consider that form B is stored (together with other similar, yet, but identical forms) in the database (5), and in contrast to the stipulation of the invention, one of the boxes in the "white area" (61) serves as a verification box for form B (vis-a-vis form A). Assuming now that an input filled-in form is fed to the system for classifying it as one of the stored candidate forms. Assuming further that the permanent part of the input form (i.e. the part that constitutes the unfilled input form) is identical to form B, it is obviously required that the classifying process identifies form B (from among the rest of the stored forms) as the one that corresponds to the input form.

The utilization of a verification box of the kind specified (i.e. having a large "white space") may fail in accomplishing the desired identification. The reason is that the white area (61) in the form is susceptible to being filled in with data, e.g. the stamp "received" may be stamped on the white area of the top left part of the form by the receiving authority that processes the health insurance claim form or the applicant may add comments which he/she considers as important and which do not fit in any of the fields of the form etc. Thus, when the verification box of the blank form, (being, as recalled, a white space) is compared to the corresponding area in the filled-in form, the obvious result is a mismatch, and accordingly the candidate form (form B) is unduly rejected as a possible candidate despite the fact that form B is indeed the right one.

Since, according to the invention, a white space area (serving as one possible criteria for "filled-in area") is not selected as a verification box the specified ill-conceived scenario is avoided.

Reverting now to FIG. 2, since no box is selected as a verification box (27), the next step (28) is performed, where the roles of the forms A and B are reversed.

Practically speaking, when referring to the example of FIGS. 5A and 5B, the box or boxes that are deemed sufficiently distinguishable in area (60) in form A remain after the rest of the boxes have been rejected in steps (29) and (30). Next, in step (31) (and in contrast to step (26)), the specified remaining box or boxes are selected since they have a good score due to the fact that they have only limited white space (and not too much black space).

The box with the best ranking score (from among the remaining boxes) is selected as a rejection box. In other words, the distinguishing feature of form B vis-a-vis form A is selected from form A and is classified as a rejection box.

The utilization of verification and rejection boxes will be described in greater detail with reference to FIG. 4 below.

It should be noted that the invention is by no means limited to the specific steps described with reference to FIG. 2, and three out of many possible variants are listed below:

The order of the steps may be changed, e.g. the rejections of boxes may be effected after the box ranking and matching steps (23–26) are completed.

The matching steps may regard as "corresponding boxes" also neighboring boxes that reside in the vicinity of the box under question and possibly weigh the matching results obtained in respect of each or some neighboring box.

More than one verification or rejection box is obtained per each couple of forms.

The specified procedure described with reference to FIGS. 2 and 3 is, preferably, repeated in respect of each one of the stored candidate forms, generating for each candidate form a verification or rejection box (or boxes). Put differently, in the case that there are two other similar forms (say C and D) stored in database (5), the procedure is repeated between form B and C giving rise to a verification or rejection box and again between form B and D giving rise to another verification or rejection box.

It should be noted that the specified verification/rejection boxes need not necessarily be different in respect of each stored candidate form. In other words, there may be a case where a given box serves as a verification or rejection box of an input form (e.g. form B in the latter example) vis-a-vis more than one form (say, the specified box serves as a verification box for form B vis-a-vis form A, and the same box serves as a verification box for form B vis-a-vis form C).

Figure 4:
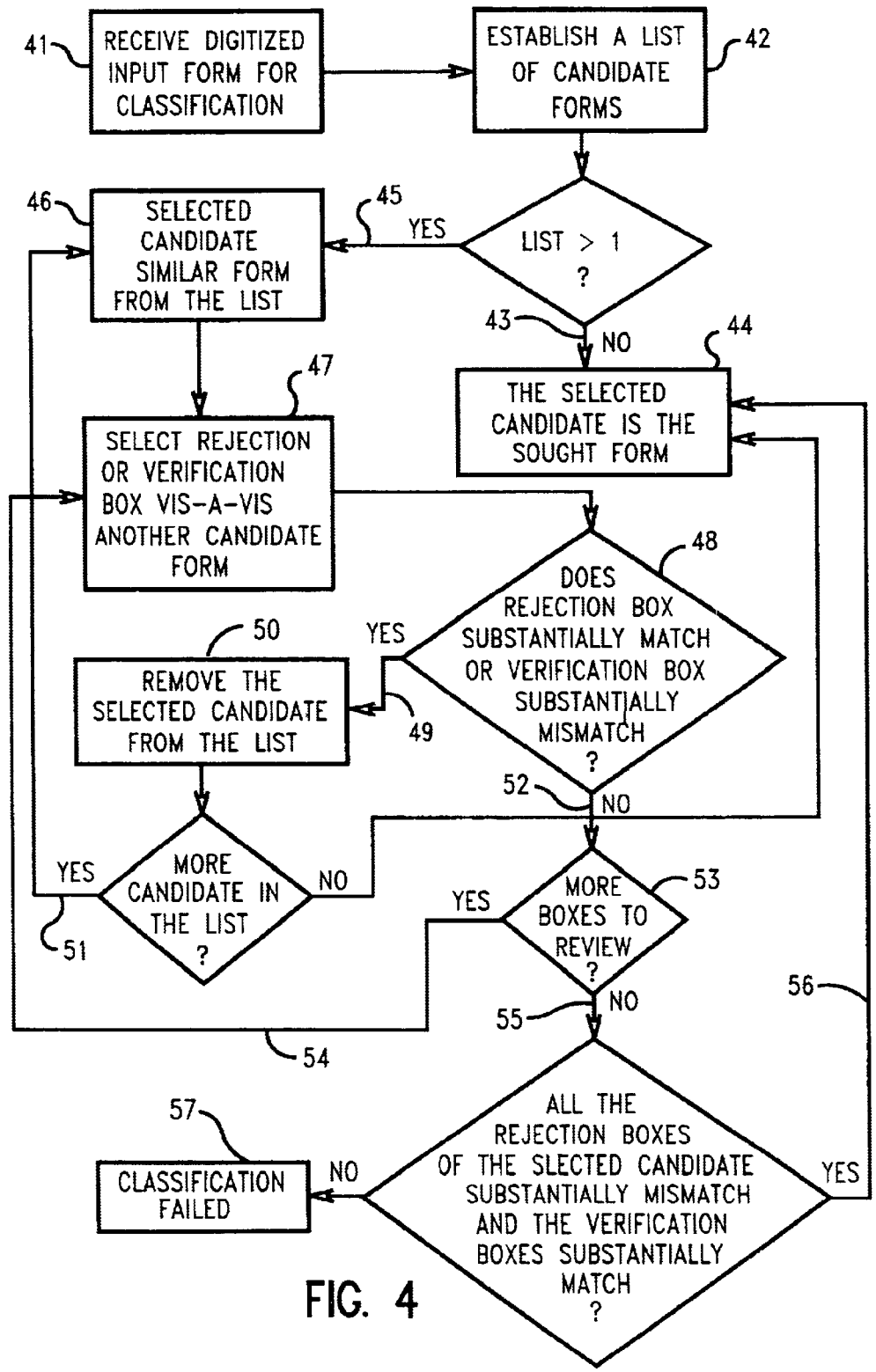
FIG. 4 is a generalized flow chart of a form classification process, according to one embodiment of the invention.

Turning now to FIG. 4, there is shown a generalized flow chart of a form classification process, according to one embodiment of the invention. Thus, in step (41) the digitized image of the input form (filled-in form) is received for processing. Next, a list of similar candidate forms is established (42). The list may be established by running a conventional pattern recognition utilities which rejects all those candidate forms in the database which clearly differ from the input form.

The forms not rejected by the specified utility constitute the candidate list. If the candidate list contains only one member, the latter is clearly the sought form ((43) and (44)). If, on the other hand, the list contains more than one member, a first candidate from the list is selected ((45) and (46)).

As specified above, the candidate form is associated with a verification or rejection box vis-a-vis each of the other candidates. Accordingly, a first verification or rejection box (as the case may be) is selected (47). Next, in step (48), the so selected box is compared to the corresponding area of the input form, utilizing known per se pattern matching techniques. In the case that the selected box is a verification box and the resulting comparison gives rise to a substantially mismatch result, this clearly indicates that the candidate form doesn't correspond to the input form (49). By the same token, in the case that the selected box is a rejection box and the resulting comparison gives rise to a substantially match result, this clearly indicated that the candidate form doesn't correspond to the input form (49). In this connection it is recalled that the rejection box associated with a given form belongs to another candidate form (e.g. rejection fox for form B in FIG. 5B is taken from area (60) of form A—see FIG. 5A) and accordingly, if the corresponding area in the input form matches the rejection box this clearly indicates that the selected candidate doesn't correspond to the input form.

Following (49), the selected candidate form (that has currently been rejected) is removed from the list (50) and the next candidate in the list is selected (51). The procedure is repeated in respect of the new candidate form in the manner specified.

Reverting now to step (48), in the case that the comparison gives rise to a substantially mismatch (in the case of a rejection box), or a substantially match (in the case of a verification box) it is still required to show that no other candidates in the list are also valid. To this end, the rest of the candidate forms (or the verification boxes in the current form vis-a-vis the rest of the candidates in the list) should be checked ((53) and (54)).

If all the rejection boxes of the selected candidate vis-a-vis the remaining candidates in the list give rise to substantially mismatch result and the verification boxes in the list vis-a-vis the remaining candidates in the list gives rise to substantially match result (steps (55) and (56)),this indicates that the rest of the candidates are inappropriate candidates and the selected candidate under question is the sought candidate form that corresponds to the input form. Otherwise, the classification process failed (57), and possibly another classification strategy should be used (e.g. using different property).

The embodiment of FIG. 4 should by no means be regarded as binding. Accordingly, some out of many possible variants, include:

Steps (55) and (56) are not necessarily applied to the verification or rejection boxes that are associated with the selected form under question. Thus, if a given box serves as a verification or rejection box vis-a-vis another candidate form (say candidate form C), then in accordance with step (47) instead of utilizing the specified given box, the corresponding box in the candidate form C (vis-a-vis the current candidate form), may be checked.

Selection of candidate form (e.g. step (46)) and/or verification/rejection box (e.g. in step (47)) is done randomly or if desired by applying one or more optimizing criteria.

In the case that lower level of confidence is tolerable (or for any other reason) it is not obligatory to store for each candidate a verification/rejection box vis-a-vis any other respective members in the list of candidates.

According to the invention, it is not obligatory to test the verification/rejection boxes (or other property in the broader sense of the invention), but rather only number of candidates may be processed in order to classify the input form at a desired level of confidence utilizing to this end e.g. known per se statistical tests. The same applied to the number of boxes (in the case that there is more than one) that are processed vis-a-vis a given candidate.

Those versed in the art will readily appreciate that the utilization of areas as a form property for determining fill-in likelihood (in connection with training and/or classification purposes) is only one out of many possible variants. Accordingly, other properties of the form may be utilized e.g. areas of given colors as compared to other areas, relationships between areas in the form, such as distances between sections of the form. The property or properties are not necessarily used for analyzing the likelihood that as given area is a fill-in area, but rather other purposes may be tested in order to test invariability under use, e.g. to rank properties (areas) according to their likelihood of being foldable areas (such as area in the form that is folded when the form is sent in an envelope)

Numbers, alphabetic characters and Roman numerals that appear in the claims below are designated for convenience of understanding and do not necessarily imply any specific order of steps.

The present invention has been described with a certain degree of particularity, but those versed in the art will readily appreciate that various alterations and modifications may be carried out without departing from the scope and spirit of the following claims.

I claim:

1. A method for identifying at least one distinguishing feature between an input new blank form B and an already stored blank form A, comprising the steps of:
   a) obtaining first and second images that correspond to said form A and form B, respectively;
   b) substantially aligning the first image with respect to the second image or vise versa;
   c) defining boxes in the second image, each box constituting a sub-image in said image that corresponds to an area in the blank form B;
   d) ranking the boxes so as to give rise to respective box rank scores, the ranking criteria used for ranking each box includes a first criterion: the likelihood that the area in the blank form B is a fill-in area;
   e) identifying a box from among the boxes of step (d) such that at least the following conditions are met:
      i) it is sufficiently distinguishable from a corresponding box of said first image, and
      ii) it has a box rank score meeting a distinguishable box criterion, said box constituting a verification box; and
   f) in the case that no box is identified in said step (e), identifying a box from among the boxes of said first image such that at least the following conditions are met:
      i) it is sufficiently distinguishable from a corresponding box of said second image, and
      ii) it has a box rank score meeting a distinguishable box criterion, said box constituting a rejection box.

2. The method of claim 1, wherein said step (c) includes:
   defining boxes in the second image such that the image is partitioned to substantially non-overlapping square or rectangular boxes.

3. The method of claim 1, wherein said first criterion stipulated in said step (d) includes:
   the likelihood that the area in the blank form B is a fill-in area is determined by calculating blank space in said box such that much blank space in said blank form indicates higher likelihood that the area is a fill-in area; said ranking criteria further includes a second criterion: calculating non-blank space in the box, the rank score is determined such that the maximum space from among said blank space and non-blank space is calculated and the larger the calculated maximum space, the higher the rank score.

4. The method of claim 1, wherein said condition in step (e)(i) includes a box is sufficiently distinguishable from a corresponding box, if:
   there is sufficient difference between the box and the corresponding box, and there is sufficient difference between when the box is slightly shifted in given directions and the corresponding box slightly shifted in given directions.

5. The method of claim 4, wherein said condition in step (f)(i) includes: a box is sufficiently distinguishable from a corresponding box if:
   there is sufficient difference between the box and the corresponding box, and there is sufficient difference between when the box is slightly shifted in given directions and the corresponding box slightly shifted in said given directions.

6. The method of claim 1, wherein the condition in said step (e)(ii) includes: said box has a highest box rank score from among said box rank scores.

7. The method of claim 6, wherein the condition in said step (f) (ii) includes:
   said box has a highest box rank score from among said box rank scores.

8. A method for identifying at least one distinguishing feature between an input new blank form B and a stored blank form A, comprising the steps of:
   a) identifying at least one property in the input blank form which is sufficiently distinguishable from a corresponding property in the stored blank form; said identified property complies at least with a criterion that relates to the likelihood that the property is retained substantially invariable under use of the input form; said property constitutes a verification property; and
   b) in the case that no property is identified in said step (a), identifying at least one property in the other form which is sufficiently distinguishable from a corresponding property in the input form; said identified property complies at least with a criterion that relates to the likelihood that the property is retained invariable under use of the input form; said property constitutes a rejection property.

9. The method of claim 8, wherein said property being at least one area in the form, and wherein said criterion relates to the likelihood that the area is a fill-in area.

10. A method for classifying an input form as corresponding to a candidate blank form from among a list of candidate blank forms; each one of said candidate forms is associated with at least one verification property or rejection property vis-a-vis respective form in said list; said verification property corresponds to a property in said each one that sufficiently distinguishes it vis-a-vis another form in the list; said rejection property corresponds to a property in said another form that sufficiently distinguishes it vis-a-vis said candidate form;
the method comprising the steps of:
  a) selecting a candidate form from said list;
    for the verification property associated with said candidate form, if any, perform:
  in the case that the verification property substantially mismatches a corresponding property in the input form, indicating that said candidate form does not correspond to said input form; or, for said rejection property associated with said candidate form, if any perform: in the case that the rejection property substantially matches a corresponding property in the input form, indicating that said candidate form does not correspond to said input form; and
  b) in the case that the stipulations of step (a) are not met in respect of a number of said candidate forms indicating that said candidate form is classified as corresponding to said input form.

11. The method of claim 10, wherein said property being at least one area in said form.

12. A system for identifying at least one distinguishing feature between an input new blank form B and an already stored blank form A, the system includes a processor and associated memory comprising:
  a) a device for obtaining first and second images that correspond to said form A and form B, respectively;
  b) aligning device for substantially aligning the first image with respect to the second image or vise versa;
  c) box processing device for defining boxes in the second image, each box constituting a sub-image in said second image that corresponds to an area in the blank form B;
  d) box ranking device for ranking the boxes so as to give rise to respective box rank scores, ranking criteria used for ranking each box includes a first criterion: the Likelihood that the area in the blank form B is a fill-in area;
said system further including a decision unit capable of:
  e) identifying a box from among the boxes of step (d) such that at least the following conditions are met:
    i) it is sufficiently distinguishable from a corresponding box of said first image, and
    ii) it has a good box rank score, said box constituting a verification box;
  f) in the case that no box is identified in (e), identifying a box from among the boxes of said first image such that at least the following conditions are met:
    i) it is sufficiently distinguishable from a corresponding box of said second image, and
    ii) it has a good box rank score, said box constituting a rejection box.

13. A system for identifying at least one distinguishing feature between an input new blank form B and other blank form A, the system comprising a processor and associated memory capable of:
  a) identifying at least one property in the input new blank form B which is sufficiently distinguishable from a corresponding property in the other blank form A; said identified property complies at least with a criterion that relates to the likelihood that the property is retained substantially invariable under use of the form; said property constitutes a verification property; and
  b) in the case that no property is identified in (a), identifying at least one property in the other blank form A which is sufficiently distinguishable from a corresponding property in the input new blank form B; said identified property complies at least with a criterion that relates to the likelihood that the property is retained invariable under use of the input new blank form B; said property constitutes a rejection property.

14. A system for classifying an input form as corresponding to a candidate blank form from among a list of candidate blank forms; each one of said candidate forms is associated with at least one verification property or rejection property vis-a-vis respective form in said list; said verification property corresponds to a property in said candidate form that sufficiently distinguishes it vis-a-vis another form in the list; said rejection property corresponds to a property in said another form that sufficiently distinguishes it vis-a-vis said candidate form;
the system comprising a processor and associated memory capable of:
  a) selecting a candidate form from said list;
    for the verification property associated with said candidate form, if any perform: in the case that the verification property substantially mismatches a corresponding property in the input form, indicating that said candidate form does not correspond to said input form; or, for the rejection property associated with said candidate form, if any perform: in the case that the rejection property substantially matches a corresponding property in the input form, indicating that said candidate form does not correspond to said input form; and
  b) in the case that the stipulations of step (a) are not met in respect of a number of said candidate forms indicating that said candidate form is classified as corresponding to said input form.

15. A processor having associated memory that includes data usable by an application selected from a group that includes form training and form classification applications; the data includes data being representative of:
  a plurality of a similar forms, each form is associated with:
    at least one verification property which is sufficiently distinguishable vis-a-vis the verification property of another form; said verification property complies at least with a criterion that relates to the likelihood that the verification property is retained substantially invariable under use of the associated said each form; and
    at least one rejection property of said another form which is sufficiently distinguishable vis-a-vis the rejection property of said form; said rejection property complies at least with a criterion that relates to the likelihood that the rejection property is retained substantially invariable under use of the associated said each form.

16. A computer program product for identifying at least one distinguishing feature between an input new blank form B and an already stored blank form A, said computer program product comprising a computer usable medium having computer readable program code thereon, said computer readable program code comprising:

computer program code means for obtaining a first image corresponding to a previously stored blank form A and a second image corresponding to an input new blank form B;

computer program code means for aligning said first image and said second image;

computer program code means for boxing sub-images in said second image, each boxed sub-image corresponding to an area in said new blank form B;

computer program code means for ranking said boxed sub-images to determine respective box rank scores, each box rank score indicating the likelihood that a corresponding boxed sub-image is a fill-in area in said new blank form B;

computer program code means for distinguishing said boxed sub-images from a corresponding box of said first image; and computer program code means for identifying verification boxes and rejection boxes from distinguished said boxed sub-images responsive to said box rank scores.

17. A computer program product as in claim 16, wherein said computer program code means for boxing sub-images comprises:

computer program code means for partitioning said second image into non-overlapping square or rectangular boxes.

18. A computer program product as in claim 16, wherein computer program code means for ranking boxed said sub-images comprises:

computer program code means for calculating the white space in said box such that much white space in said blank form indicates higher likelihood that the area is a fill-in area; and computer program code means for calculating the black space in the box, the rank score being determined such that the maximum space from among said white space and black space, the larger the calculated maximum space, the higher the rank score.

19. A computer program product as in claim 18, wherein said computer program code means for distinguishing said boxed sub-images comprises:

computer program code means for determining whether there is sufficient difference between corresponding boxes, there being sufficient difference between said corresponding boxes when one box is determined slightly shifted in with respect to its the corresponding box.

* * * * *